(12) United States Patent
Moore

(10) Patent No.: US 6,715,062 B1
(45) Date of Patent: Mar. 30, 2004

(54) PROCESSOR AND METHOD FOR PERFORMING A HARDWARE TEST DURING INSTRUCTION EXECUTION IN A NORMAL MODE

(75) Inventor: Charles Robert Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/626,248

(22) Filed: Jul. 26, 2000

(51) Int. Cl.[7] .......................... G06F 9/44; G06F 11/25; G06F 11/273; G06F 11/263
(52) U.S. Cl. .......................... 712/227; 714/10; 714/11; 714/31; 714/48
(58) Field of Search ............................. 714/718, 10, 15, 714/6, 11, 30, 31, 48, 726, 733; 712/227

(56) References Cited

U.S. PATENT DOCUMENTS 5,077,663 A  * 12/1991  Kanazawa ................... 714/10
5,363,502 A  * 11/1994  Kagimasa et al. ............. 714/6
5,515,519 A  *  5/1996  Yoshioka et al. ........... 712/234

* cited by examiner

Primary Examiner—Daniel H. Pan
(74) Attorney, Agent, or Firm—Volel Emile; Diana L. Roberts; Bracewell & Patterson, L.L.P.

(57) ABSTRACT

A processor includes instruction sequencing logic, execution circuitry, data storage coupled to the execution circuitry, and test circuitry. The test circuitry detects for a hardware error in one of the instruction sequencing logic, execution circuitry, and data storage during functional operation of the processor in response to an instruction within an instruction stream provided by the instruction sequencing logic. In one embodiment, a hardware error can be detected by comparing values output in response to a test instruction by redundant circuitry that performs the same function. Alternatively or in addition, a hardware error can be detected by performing an arithmetic or logical operation having a known result (e.g., multiplication by 1, addition of 0, etc.) in response to the test instruction.

15 Claims, 4 Drawing Sheets

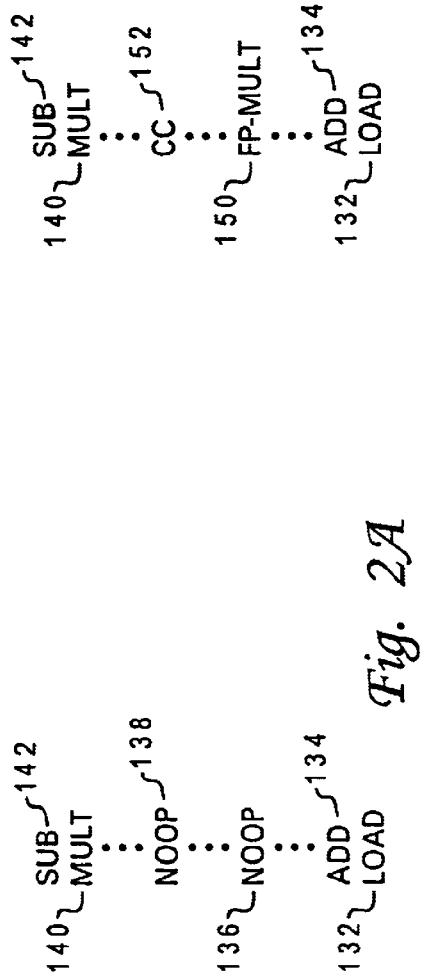
Fig. 2A
Fig. 2B
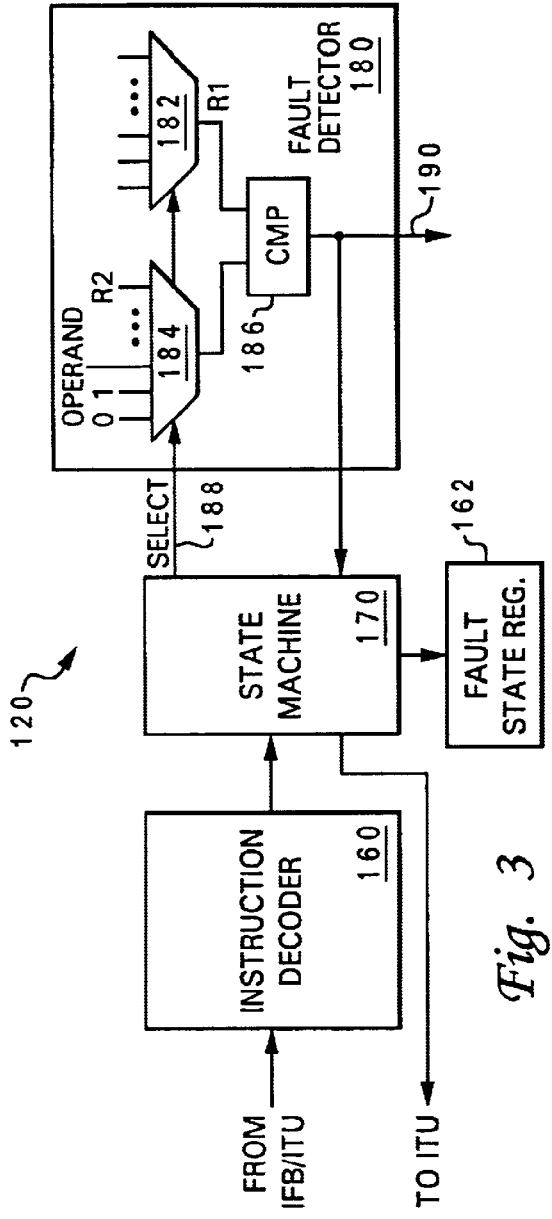
Fig. 3

PROCESSOR AND METHOD FOR PERFORMING A HARDWARE TEST DURING INSTRUCTION EXECUTION IN A NORMAL MODE

BACKGROUND OF THE INVENTION

1. Technical Field

The present invention relates in general to data processing and, in particular, to the detection of hardware errors within a processor. Still more particularly, the present invention relates to a processor that self-tests for hardware errors in response to an instruction while operating in a normal mode.

2. Description of the Related Art

A typical superscalar processor comprises a digital integrated circuit including, for example, an instruction cache for storing instructions, one or more execution units for executing sequential instructions, a branch unit for executing branch instructions, instruction sequencing logic for routing instructions to the various execution units, and registers for storing operands and result data. In order to verify the proper operation of complex digital circuitry, such as the conventional superscalar processor described above, during normal functional operation, it is well-known to incorporate parity checking circuitry within the circuit design. However, because of the expense and complexity involved with parity checking each computational circuit of a superscalar processor, parity checking circuitry is often implemented only for storage circuitry, such as processor register files and on-chip cache memory. As a result, the computational circuitry of a conventional processor often remains untested during normal functional operation. Thus, computational errors resulting from a hardware failure may remain undetected, leading to corrupted data or system failure.

SUMMARY OF THE INVENTION

To address the above and other shortcomings in the art, the present invention provides a processor that utilizes no-op (or other predetermined) instruction cycles to perform a hardware test on processor circuitry without the need for complex parity checking circuitry.

In accordance with the present invention, a processor capable of self-test includes instruction sequencing logic, execution circuitry, data storage coupled to the execution circuitry, and test circuitry. The test circuitry detects for a hardware error in one of the instruction sequencing logic, execution circuitry, and data storage during normal functional operation of the processor in response to an instruction within an instruction stream provided by the instruction sequencing logic. In one embodiment, a hardware error can be detected by comparing values output in response to a test instruction by redundant circuitry that performs the same function. Alternatively or in addition, a hardware error can be detected by performing an arithmetic or logical operation having a known result (e.g., multiplication by 1, addition of 0, etc.) in response to the test instruction.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A and 2B illustrate the translation of no-op instructions within an instruction stream into test instructions in accordance with a preferred embodiment of the present invention;

FIG. 3 depicts a more detailed block diagram of the test circuitry shown in FIG. 1;

DETAILED DESCRIPTION OF ILLUSTRATIVE EMBODIMENT

Figure 1:
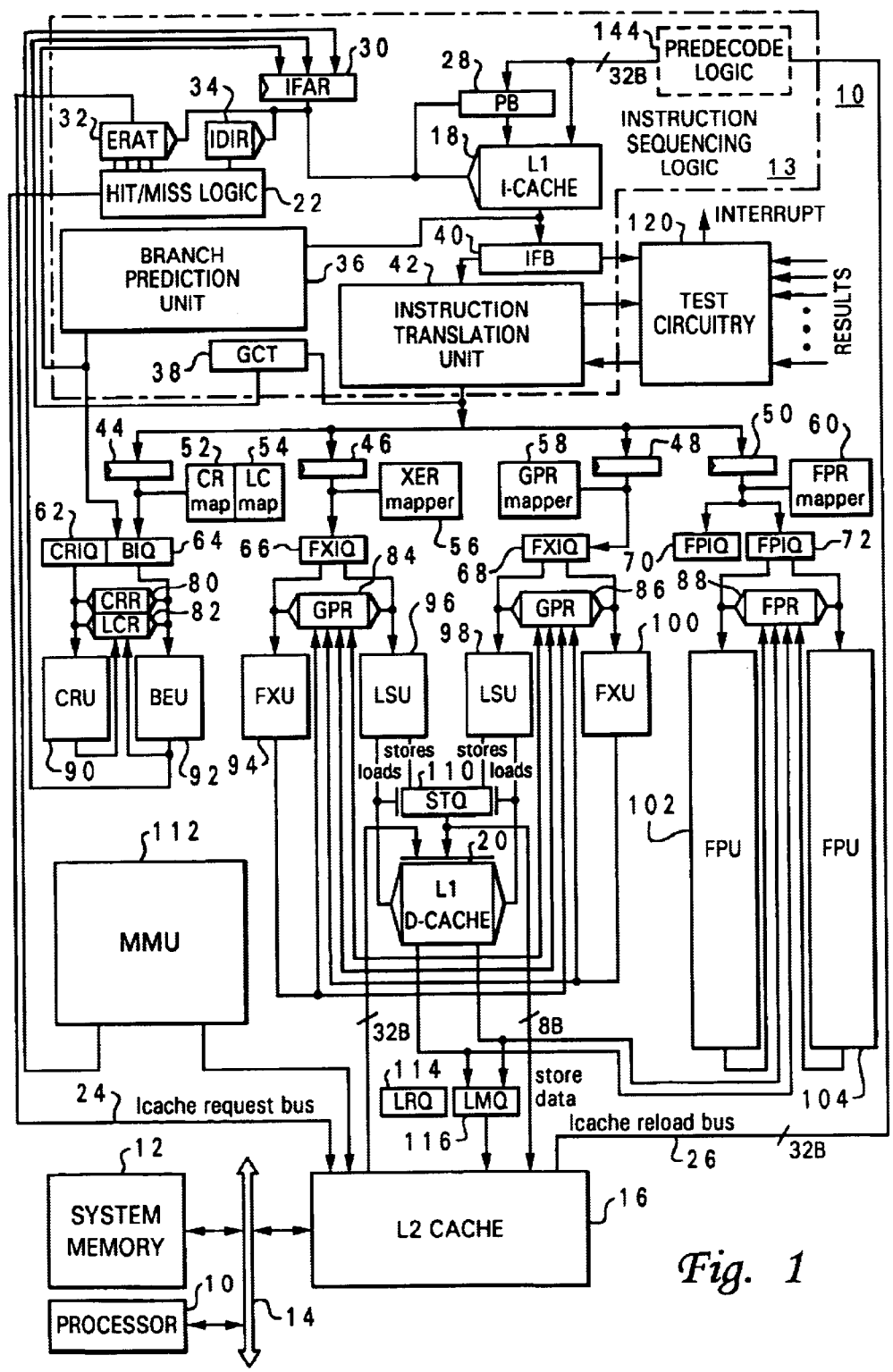
FIG. 1 depicts an illustrative embodiment of a data processing system with which the method and system of the present invention may advantageously be utilized.

With reference now to the figures and in particular with reference to FIG. 1, there is depicted a high level block diagram of an illustrative embodiment of a processor, indicated generally at 10, for processing instructions and data in accordance with the present invention. In particular, processor 10 provides improved hardware fault detection by performing a hardware self-test in response to test instructions.

PROCESSOR OVERVIEW

Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as a workstation computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache 18 via I-cache reload bus 26, possibly after passing through optional predecode logic 144 (described below).

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. The instructions, however, are maintained in issue queues 62–72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs). 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Hardware Testing

Like any other electrical circuitry, the integrated circuitry of processor 10 described above is subject to hardware failure, for example, due to fabrication process irregularities or environmental conditions. Accordingly, during the fabrication and packaging process, processor 10 will typically be subjected to a number of conventional environmental and electrical tests, including device tests and system (e.g., board) tests, in order to determine if processor has suffered a hardware failure. To facilitate such testing, processor 10 may include an IEEE Std. 1149.1-compliant boundary scan interface (not illustrated) coupled between the internal logic illustrated in FIG. 1 and the input/output (I/O) pins of the chip package. As is well known to those skilled in the art, the IEEE Std. 1149.1 interface also defines a test access port (TAP) controller that, in response to various test instructions, places processor 10 in a TEST mode, which is defined herein as the state of a device where pins, test circuitry, and internal logic are configured for testing rather than for normal system operation. In TEST mode, the TAP controller may execute an instruction (e.g., EXTEST instruction) to test only the output pins or may alternatively execute test instructions (e.g., INTEST or RUNBIST) to test the internal logic of processor 10. Further information regarding the IEEE Std. 1149.1 TAP controller and its associated test instructions may be found in "Standard Test Access Port and Boundary-Scan Architecture," Institute of Electrical and Electronics Engineers (May 21, 1990) and the 1149.1b-1994 Supplement, which are both incorporated herein by reference.

Although the device and board testing defined by IEEE Std. 1149.1 enables the detection of hardware faults, such testing is limited in that hardware faults can only be detected when the device under test (DUT) or board under test (BUT) is configured in the TEST mode. Generally speaking, a device or board is seldom, if ever, placed in the TEST mode to allow detection of hardware faults following deployment in its end use. In other words, following deployment, hardware failures in conventional systems are generally not detected until significant data corruption or system failure occurs.

The present invention provides improved hardware fault detection by detecting hardware faults occurring during a normal mode of processor operation, thus permitting earlier corrective action, perhaps prior to system failure or significant data corruption. As utilized herein, "normal mode" (or "normal operation") is defined as a non-TEST mode of operation in which instructions within a processor's UISA or IISA are executed by a processor to perform useful work. In accordance with the present invention, hardware fault testing in the normal mode is accomplished by inserting or designating one or more instructions in an instruction stream as test instructions and then performing hardware fault testing of the processor's instruction sequencing logic 13, execution circuitry (e.g., execution units 90–104), and/or data storage (e.g., register files 80–88) in response to such test instructions during execution of the instructions within the instruction stream. In this manner, if processor faults occur after deployment, the faults will not go undetected, and will eventually be discovered by the systematic testing of the processor's components during normal operation.

Although one or more test instructions in accordance with the present invention can be explicitly defined in the UISA or IISA of processor 10, UISA or IISA no-operation ("no-op") instructions, which perform no useful work and make no modification to the processor state, are advantageously designated as test initiation instructions in accordance with a preferred embodiment of the present invention. Although conventional no-op instructions perform no useful work in terms of moving or processing data, no-op instructions are frequently used for other reasons, such as padding timing loops in software, achieving instruction alignment on cache line boundaries, implementing desired instruction sequencing, etc. In accordance with preferred embodiments of the present invention, these no-op test initiation instructions are dynamically replaced by selected test instructions during processing in the normal mode of operation. By replacing no-op test initiation instructions with test instructions, hardware fault testing can be performed in the normal mode of operation with little or no degradation in processor performance, while preserving the other useful purposes of no-op instructions.

In view of the foregoing, it will be appreciated that test instructions can be incorporated within the instruction stream constructed by instruction sequencing logic 13 of processor 10 in a number of different ways. For example, predecode logic 144 may translate UISA no-op (or other selected) instructions fetched from L2 cache 16 into UISA or IISA test instructions prior to the storage of the instructions within L1 I-cache 18. For the embodiment depicted in FIG. 1, it is, however, more preferable for the test instructions to be designated or inserted in the instruction stream in conjunction with instruction translation by ITU 42. For ease of understanding, the circuitry that designates or inserts test instructions in the instruction stream is illustrated in FIG. 1 as separate test circuitry 120. However, it will be appreciated that such test circuitry 120 can be implemented at different locations in the instruction processing pipeline of processor 10 and may also be incorporated within ITU 42 and/or predecode logic 144.

Referring now to FIGS. 2A and 2B, the translation of no-op instructions within an exemplary instruction stream into test instructions is illustrated. In FIG. 2A, exemplary instruction stream 130*a* includes, from earliest to latest in program order, a load instruction 132, an add instruction 134, two no-op instructions 136 and 138, an integer multiply instruction 140 and a subtract instruction 142. As indicated by ellipsis notation, the instruction stream may also include many additional instructions.

In accordance with a preferred embodiment of the present invention, no-op instructions 136 and 138, which may have been present in the UISA instructions fetched from L1 I-cache 18 or inserted in instruction stream 130*a* by ITU 42 to achieve desired instruction sequencing or instruction grouping, are replaced by test circuitry 120 with test instructions, such as test instructions 150 and 152 in instruction stream 130*b* of FIG. 2B. Test instructions, such as test instructions 150 and 152, are preferably marked with a set bit in the IISA operation code (opcode) indicating that the computational results of the instructions cannot become part of the architected state of the processor. In the depicted embodiment, test instruction 150 is a floating-point multiply instruction that tests for a hardware fault in one or both of FPUs 102 and 104. Test instruction 152, on the other hand, is a condition code setting instruction that tests CRU 90 for hardware faults. As discussed further below, the operation codes of test instructions, the execution circuitry or instruction sequencing circuitry that is exercised by the test instructions, and the registers referenced by the test instructions are preferably varied during operation in order to provide broader test coverage.

With reference now to FIG. 3, there is depicted a more detailed block diagram of test circuitry 120 of FIG. 1. As shown, test circuitry 120 has three main components: an instruction decoder 160, a state machine 170 and a fault detector 180. Instruction decoder 160 is coupled to IFB 40 and/or ITU 42 such that instruction decoder 160 can detect no-op (or other selected) UISA or IISA test initiation instructions in the instruction stream constructed by ITU 42. In response to detecting a test initiation instruction in the instruction stream, instruction decoder 160 notifies state machine 170.

As described further below with reference to FIGS. 4A and 4B, state machine 170 selects, for each detected test initiation (e.g., no-op) instruction, an IISA test instruction opcode, one or more target execution units of the test instruction, and operand registers referenced by the test instruction. State machine 170 then supplies the test instruction to ITU 42 for dispatch and execution. The test instruction opcodes are preferably chosen such that each test instruction has a known result that is either predetermined (i.e., constant) or that can be dynamically verified by processor 10 without a priori information about the test instruction. In the latter case, the result can be dynamically verified by comparing the output result with an input operand or by comparing outputs of redundant processor hardware. Thus, if the test instruction is intended to test redundant execution units such as FXUs 94 and 100, the test instruction (e.g., an integer add) can be dispatched to both latches 46 and 48 for execution by FXUs 94 and 100, and the sums produced by execution of the two integer add instructions can be compared (by fault detector 180) to determine if a hardware fault has occurred in one of FXUs 94 and 100.

It should be noted that multiple instances of a test instruction can be generated in a number of different ways. First, dispatch logic in ITU 42 can be configured to automatically dispatch copies of the same test instruction to different execution units if the test instruction targets hardware for which redundant instances exist. Second, a bit in the opcode of the test instruction can be set by state machine 170 to indicate that the test instruction should be dispatched twice. Third, state machine 170 can simply insert multiple identical IISA test instructions into the instruction stream in ITU 42.

Still referring to FIG. 3, following execution of a test instruction, fault detector 180 within test circuitry 120 detects whether a hardware fault has occurred by reference to the execution results of the test instruction. Detection of a hardware fault involves four basic functions, which, in the illustrated embodiment, are performed by multiplexers 182–184 and comparator 186. First, as represented by multiplexer 182, fault detector 180 selects the appropriate source of the execution result (R1) of the test instruction based upon one or more select signals 188 indicative of the corresponding state of state machine 170. The sources of the execution results preferably include at least the outputs of all of execution units 90–104 and/or register files 80–88. Second, multiplexer 186 selects an appropriate expected value to compare with the execution result (R1) of the test instruction based upon one or more select signals 188. As illustrated, the possible values preferably include at least 0, 1, an input operand value, and R2, which is the execution result produced by a second instance of redundant processor hardware. Third, as represented by comparator 186, fault detector 180 detects a hardware fault by comparing the execution result (R1) of the test instruction output by multiplexer 182 with the expected value selected by multiplexer 184. Fourth, fault detector 180 signals a hardware fault if the expected value selected by multiplexer 184 and execution result R1 do not identically match. In the illustrated embodiment, fault detector 180 signals detection of a hardware fault by comparator 186 asserting a high priority hardware fault interrupt on signal line 190. In order to provide additional information regarding detected hardware faults to the interrupt handler, when comparator 186 asserts a hardware fault interrupt, state machine 170 stores an indication of the state in which the hardware fault was detected into a software-accessible fault state register 162. The interrupt handler routine may then address the detected hardware fault, for example, by causing the operating system to no longer schedule certain types of processes or operations to processor 10 or by disabling processor 10.

Figure 4A:
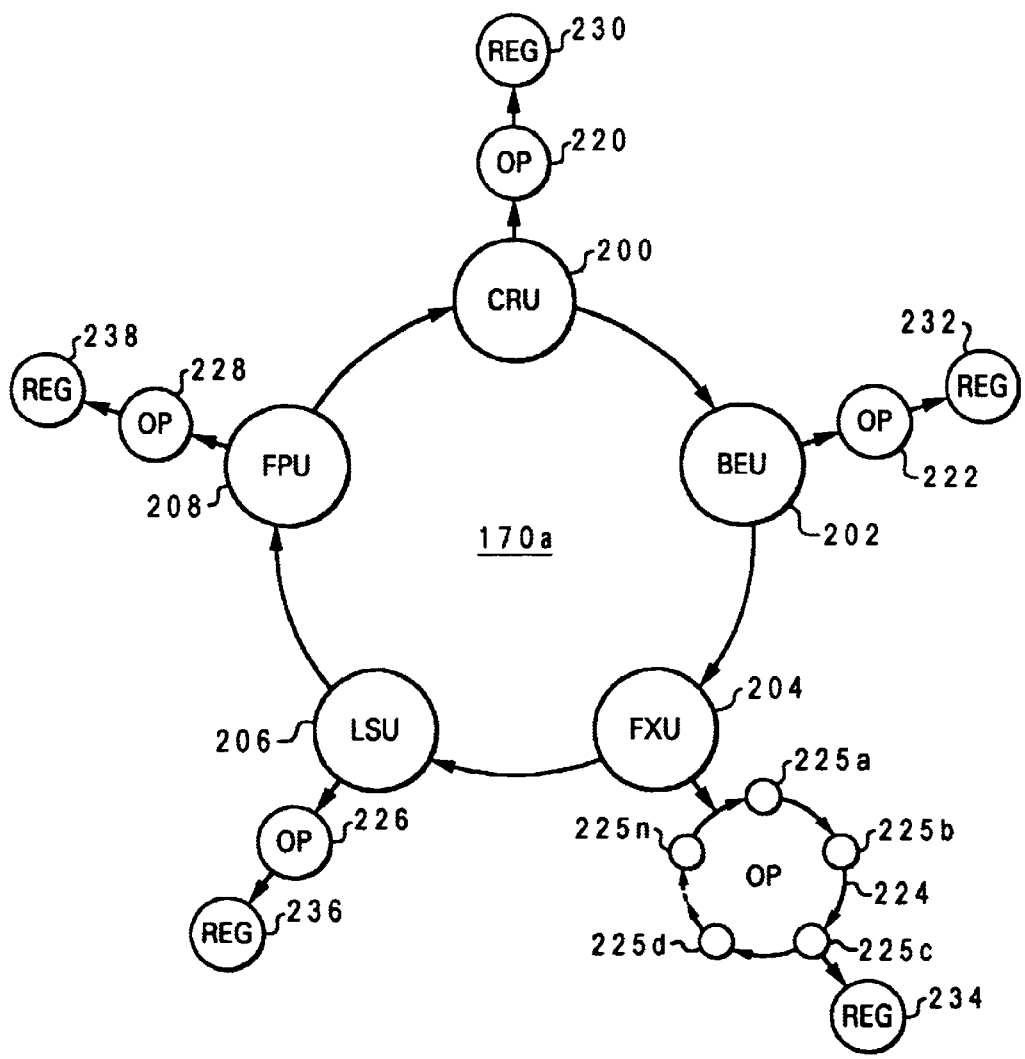
FIG. 4A is a first exemplary embodiment of a testing state machine in accordance with the present invention.

Referring now to FIG. 4A, a state diagram of a first exemplary embodiment of a state machine 170a in accordance with the present invention is illustrated. In the first exemplary embodiment, state machine 170a includes 5 base states 200–208 that each respectively correspond to a unique execution unit type. Thus, as illustrated, base state 200 corresponds to CRU 90, base state 202 corresponds to BEU 92, base state 204 corresponds to FXUs 94 and 100, base state 206 corresponds to LSUs 96 and 98, and base state 208 corresponds to FPUs 102 and 104. The detection by instruction decoder 160 of a no-op (or other selected) test initiation instruction in the instruction stream causes state machine 170a to transition from a former base state to a current base state as indicated by the arrows interconnecting base states 200–208.

The current base state indicates which type of execution unit is selected as the target of the current test instruction. If the type of execution unit indicated by the current base state has redundant instances, the test instruction will be executed by at least two of the redundant instances so that the results may be compared. If, on the other hand, processor 10 contains only a single instance of the execution unit type indicated by the current base state, the execution result (R1) will be compared with a predetermined value (e.g., 0, 1, or an input operand).

As further illustrated in FIG. 4A, each of base states 200–208 has a respective associated opcode state machine 220–228 utilized to select a test instruction opcode. Each of opcode state machines 220–228 includes one or more opcode states that each represent a respective one of the IISA opcodes supported by the execution unit type corresponding to the associated base state. Thus, for example, opcode state machine 224 may include opcode states 225a–225n corresponding to integer arithmetic operations (add, subtract, multiply, divide) and integer logical operations (roll, 1's complement, 2's complement, OR, AND) supported by FXUs 94 and 100. Similarly, the opcode states of opcode state machine 228 represent the various floating-point arithmetic and logical operations supported by FPUs 102 and 104, and opcode states of opcode state machine 220 each represent one of the condition-code-setting instructions executed by CRU 90. Although many state transition schemes may be implemented, the current state of an opcode state machine is preferably updated each time a transition is made between states of the underlying base state.

As mentioned briefly above, for test instructions that will be executed by only a single execution unit, the opcodes and operands of the test instructions are preferably selected such that the execution results are known. Examples of arithmetic and logical operations that satisfy this constraint are listed in Table I below.

TABLE I

| Operation | Result |
| --- | --- |
| add 0 to operand | operand |
| subtract 0 from operand | operand |
| subtract operand from itself | 0 |
| multiply operand by 1 | operand |
| multiply operand by 0 | 0 |
| divide operand by 1 | operand |
| divide operand by itself | 1 |
| OR operand with itself | operand |
| AND operand with itself | operand |
| XOR operand with itself | 0 |

Each of base states 200–208 of state machine 170a also has a respective associated one of register state machines 230–238 that specifies the register(s) that will be accessed during execution of the test instruction selected by the associated opcode state machine. Each register state machine thus includes a plurality of states that each correspond to a respective register within the register file(s) that can be accessed by the execution unit type corresponding to the associated one of base states 200–208. As with opcode state machines 220–228, the current states of register state machines 230–238 are preferably updated each time a transition is made to the associated one of base states 200–208.

Each of register state machines 230–238 (and opcode state machines 220–228) can be independently implemented in a number of different ways, depending upon the desired test coverage and utilization of register file ports and registers. For example, to minimize the utilization of register file ports for hardware fault testing, it may be desirable to generally restrict opcodes within opcode state machines 220–228 to those having a single register operand (i.e., having only a single operand or having one or more immediate operands). In this manner, the impact of test instructions on processor performance is decreased by limiting the number of register file ports that are accessed each cycle for testing purposes.

In addition, each of register state machines 230–238 can be implemented either to allocate target registers to hold test instruction results, or alternatively, to not allocate target registers to test instructions. If test instructions are not assigned target registers, testing is simplified and less processor resources are consumed, meaning that more registers are available for execution of other instructions in the instruction stream. Greater test coverage may be obtained, however, if target registers are allocated to test instructions and the execution results of test instruction are provided to multiplexer 182 of fault detector 180 from register files 80–88 rather than directly from execution units 90–104. Of course, the execution results of a test instruction cannot be permitted to change the architected state of processor 10. Thus, if register state machines 230–238 are implemented such that target registers are assigned to test instructions, target registers holding execution results of test instructions must be marked as invalid, for example, by resetting a register valid bit when the execution results of a test instruction are transferred into a register.

Figure 4B:
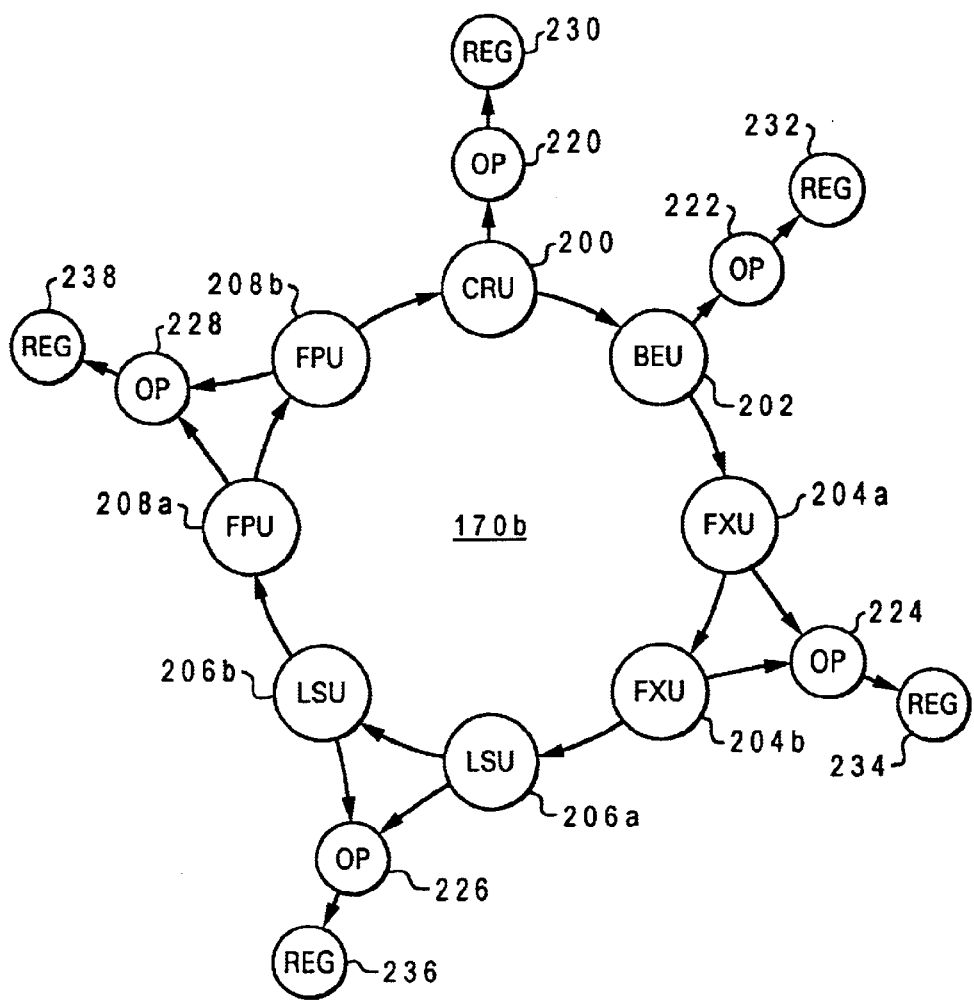
FIG. 4B is a second exemplary embodiment of a testing state machine in accordance with the present invention.

With reference now to FIG. 4B, there is a depicted a second exemplary embodiment of a state machine 170b in accordance with the present invention. State machine 170b is identical to state machine 170a of FIG. 4A except that in state machine 170b each of execution units 90–104 has its own respective base state. This distinction signifies that each test instruction is executed by only one target execution unit, even if processor 10 has redundant instances of the target execution unit. Of course, it is also possible to implement a hybrid between state machines 170a and 170b that executes some test instructions in multiple execution units and other test instructions in only one of multiple redundant execution units.

As has been described, the present invention provides an improved method and system for testing processor hardware for faults during execution of instructions in the processor's normal mode of operation. The present invention advantageously utilizes no-op instruction cycles for testing in order to minimize the impact of such testing on processor performance. Because hardware fault testing is performed in the normal mode of operation, hardware faults arising after processor deployment can be detected and addressed.

While the invention has been particularly shown and described with reference to a preferred embodiment, it will be understood by those skilled in the art that various changes in form and detail may be made therein without departing from the spirit and scope of the invention. For example, the present invention is not limited to a particular processor architecture or to processor architectures that utilize instruction translation, but is applicable to any processor architecture. Similarly, although the foregoing description of the present invention assumes that hardware testing is conducted in response to each no-op or other selected test instruction, it should be understood that in some embodiments of the invention the hardware testing performed by test circuitry 120 can be turned on and off, for example, by setting and resetting a software accessible bit in a processor control register.

What is claimed is:

1. A processor, comprising:
   instruction sequencing logic that provides a stream of instructions including a test initiation instruction for execution;
   execution circuitry;
   data storage coupled to said execution circuitry;
   test circuitry that, during execution of said stream of instructions by said execution circuitry in a normal mode of operation, detects for a hardware error in one of said instruction sequencing logic, said execution circuitry, and said data storage in response to said test initiation instruction;
   wherein at least one of said instruction sequencing logic, said execution circuitry, and said data storage includes first circuitry and second circuitry that both perform a same function in response to said test initiation instruction;
   wherein said test circuitry detects for a hardware error by comparing values output in response to said test initiation instruction by said first circuitry and said second circuitry; and
   wherein said first circuitry and said second circuitry are each capable of performing at least a first computational function and a different second computational function, said test initiation instruction comprises a first test instruction, and said stream of instructions includes a second test instruction, wherein said first and second circuitry both perform said first computational function in response to said first test instruction and both perform said second computational function in response to said second test instruction.

2. The processor of claim 1, wherein said test initiation instruction is a no-op instruction.

3. The processor of claim 1, wherein said test circuitry inserts a test instruction in said instruction stream in lieu of said test initiation instruction.

4. The processor of claim 1, wherein said first circuitry comprises first data storage that outputs a first value to said test circuitry, and wherein said second circuitry comprises second data storage that outputs a second value to said test circuitry.

5. The processor of claim 4, wherein said first data storage and said second data storage each comprise a register set.

6. The processor of claim 1, wherein said execution circuitry performs an arithmetic or logical operation having a predetermined result in response to said test instruction.

7. The processor of claim 6, wherein said execution circuitry stores a result of said arithmetic or logical operation in said data storage and said test circuitry detects for a hardware result by testing said result stored in said data storage.

8. The processor of claim 1, wherein said test circuitry asserts an interrupt in response to detecting a hardware error.

9. A method in a processor including instruction sequencing logic, execution circuitry and data storage, at least one of which includes first and second circuitry, said method comprising:

providing a stream of instructions including first and second test instructions to execution circuitry of the processor for execution;

executing the stream of instructions by the execution circuitry in a normal mode of operation, said executing includes performing a first computational function in both said first and second circuitry in response to said first test instruction and performing a second computational function in both said first and second circuitry in response to said second test instruction;

during execution of said stream of instructions by the execution circuitry in the normal mode of operation, detecting for a hardware error in one of instruction sequencing logic, execution circuitry, and data storage of the processor in response to said first test instruction, wherein said detecting includes comparing values output in response to said first test instruction by said first circuitry and said second circuitry to detect an error.

10. The method of claim 9, wherein said first test instruction is a no-op instruction.

11. The method of claim 9, wherein said detecting step comprises prior to execution of a test initiation instruction within the instruction stream, inserting the first test instruction in said instruction stream in lieu of said test initiation instruction.

12. The method of claim 9, wherein said first and second circuitry comprise first and second data storage, said method further comprising outputting a first value from said first data storage and outputting a second value from said second data storage.

13. The method of claim 9, wherein said detecting comprises performing an arithmetic or logical operation having a predetermined result in response to said first test instruction.

14. The method of claim 13, and further comprising storing a result of said arithmetic or logical operation in data storage and testing for a hardware error by reference to said stored result.

15. The method of claim 9, asserting an interrupt in response to detecting a hardware error.

* * * * *